(12) United States Patent
Rosman

(10) Patent No.: US 8,567,544 B2
(45) Date of Patent: Oct. 29, 2013

(54) COMPRESSED GAS CONTAINER AS FRAME OF VEHICLE

(75) Inventor: Allan Rosman, Calabasas, CA (US)

(73) Assignee: Allan Rosman, Calabasas, CA (US)

( * ) Notice: Subject to any disclaimer, the term of this patent is extended or adjusted under 35 U.S.C. 154(b) by 0 days.

(21) Appl. No.: 13/289,347

(22) Filed: Nov. 4, 2011

(65) Prior Publication Data

US 2012/0048414 A1 Mar. 1, 2012

Related U.S. Application Data

(63) Continuation of application No. 12/804,240, filed on Jul. 19, 2010, now Pat. No. 8,079,437, which is a continuation-in-part of application No. 12/313,046, filed on Nov. 17, 2008, now abandoned.

(51) Int. Cl.
*B60K 6/12* (2006.01)
(52) U.S. Cl.
USPC .......................................... 180/165; 180/302
(58) Field of Classification Search
USPC ........... 180/165, 302, 311; 280/781, 782, 786
See application file for complete search history.

(56) References Cited

U.S. PATENT DOCUMENTS

| | | | |
|---|---|---|---|
| 1,349,924 A | | 8/1920 | Swanson |
| 1,902,124 A | * | 3/1933 | Halloran ....................... 180/302 |
| 2,122,656 A | * | 7/1938 | Paget ......................... 137/899.4 |
| 2,386,220 A | | 10/1945 | Lawler et al. |
| 3,680,313 A | | 8/1972 | Brundage |
| 3,892,283 A | | 7/1975 | Johnson |
| 3,913,453 A | | 10/1975 | Parquet |
| 4,077,211 A | | 3/1978 | Fricke |
| 4,098,083 A | | 7/1978 | Carman |
| 4,098,144 A | | 7/1978 | Besel |
| 4,132,283 A | | 1/1979 | McCurry |
| 4,215,545 A | | 8/1980 | Morello |
| 4,227,587 A | | 10/1980 | Carman |
| 4,257,509 A | * | 3/1981 | Hiraiwa et al. ............ 192/85.34 |
| 4,351,409 A | | 9/1982 | Malik |
| 4,356,773 A | | 11/1982 | Van Eyken |
| 4,387,783 A | | 6/1983 | Carman |
| 4,592,454 A | | 6/1986 | Michel |
| 4,741,410 A | | 5/1988 | Tunmore |
| 4,745,745 A | | 5/1988 | Hagin |
| 4,754,603 A | | 7/1988 | Rosman |
| 4,760,697 A | | 8/1988 | Heggie |

(Continued)

FOREIGN PATENT DOCUMENTS

| | | |
|---|---|---|
| EP | 2 362 839 A1 | 9/2011 |
| WO | WO-2010/056356 A1 | 5/2010 |

OTHER PUBLICATIONS

Anonymous. (2011). "Hydroforming Reviews," *Engineers Edge*, last printed Sep. 27, 2011, two pages.

(Continued)

*Primary Examiner* — John Walters
(74) *Attorney, Agent, or Firm* — Morrison & Foerster LLP

(57) ABSTRACT

A hybrid hydraulic power transmission system for all terrestrial's vehicles comprises a prime mover and an accumulator which could also be used as the main load bearing full or partial frame for all those vehicles. A hydraulic power integrator is operatively connected to the prime mover and the accumulator and selectively able to draw power for the vehicle from the prime mover, the accumulator, or a combination thereof.

2 Claims, 2 Drawing Sheets

(56) References Cited

U.S. PATENT DOCUMENTS

| | | | |
|---|---|---|---|
| 4,825,774 A | 5/1989 | Tani | |
| 4,964,345 A | 10/1990 | Porel | |
| 4,986,383 A | 1/1991 | Evans | |
| 5,024,489 A | 6/1991 | Tanaka | |
| 5,088,041 A | 2/1992 | Tanaka | |
| 5,173,859 A | 12/1992 | Deering | |
| 5,370,418 A * | 12/1994 | Pugh | 280/830 |
| 5,495,912 A * | 3/1996 | Gray et al. | 180/165 |
| 5,505,527 A | 4/1996 | Gray | |
| 5,545,928 A | 8/1996 | Kotani | |
| 5,579,640 A | 12/1996 | Gray | |
| 5,794,734 A | 8/1998 | Fahl | |
| 5,887,674 A | 3/1999 | Gray | |
| 5,923,096 A | 7/1999 | Manak | |
| 6,109,384 A | 8/2000 | Bromley | |
| 6,170,587 B1 | 1/2001 | Bullock | |
| 6,223,529 B1 | 5/2001 | Achten | |
| 6,311,797 B1 | 11/2001 | Hubbard | |
| 6,378,444 B1 | 4/2002 | Dastas | |
| 6,629,573 B1 | 10/2003 | Perry | |
| 6,719,080 B1 * | 4/2004 | Gray, Jr. | 180/165 |
| 6,746,031 B2 * | 6/2004 | Carlstedt | 280/124.107 |
| 6,793,029 B2 | 9/2004 | Ching | |
| 6,834,737 B2 | 12/2004 | Bloxham | |
| 6,871,599 B2 | 3/2005 | Okuno | |
| 7,100,723 B2 | 9/2006 | Roethler | |
| 7,146,266 B2 | 12/2006 | Teslak | |
| 7,147,078 B2 | 12/2006 | Teslak | |
| 7,147,239 B2 | 12/2006 | Teslak | |
| 7,232,192 B2 | 6/2007 | Teslak | |
| 7,263,424 B2 | 8/2007 | Motoyama | |
| 7,273,122 B2 | 9/2007 | Rose | |
| 7,311,163 B2 | 12/2007 | Oliver | |
| 7,401,464 B2 | 7/2008 | Yoshino | |
| 7,409,826 B2 | 8/2008 | Epshteyn | |
| 7,415,823 B2 | 8/2008 | Iwaki | |
| 7,419,025 B2 | 9/2008 | Ishi | |
| 7,426,975 B2 | 9/2008 | Toyota | |
| 7,444,809 B2 | 11/2008 | Smith | |
| 7,503,418 B2 * | 3/2009 | Mann | 180/305 |
| 7,503,586 B2 * | 3/2009 | Ramsey | 280/783 |
| 7,549,499 B2 * | 6/2009 | Delaney | 180/242 |
| 7,562,944 B2 * | 7/2009 | Walker | 303/10 |
| 7,600,376 B2 * | 10/2009 | Hall et al. | 60/413 |
| 7,654,354 B1 * | 2/2010 | Otterstrom | 180/165 |
| 8,079,437 B2 | 12/2011 | Rosman | |
| 2004/0182632 A1 | 9/2004 | Hasegawa | |
| 2006/0108866 A1 * | 5/2006 | Hunter | 303/152 |
| 2007/0227802 A1 | 10/2007 | O'Brien, II | |
| 2008/0093152 A1 | 4/2008 | Gray | |
| 2008/0179870 A1 * | 7/2008 | Theodore | 280/786 |
| 2009/0008171 A1 * | 1/2009 | Hall et al. | 180/165 |
| 2009/0008918 A1 * | 1/2009 | Hall et al. | 280/781 |
| 2010/0122864 A1 | 5/2010 | Rosman | |
| 2010/0287922 A1 | 11/2010 | Rosman | |

OTHER PUBLICATIONS

Anonymous. (2011). "What is Hydroforming," *American Hydroformers, Inc.* located at http://www.americanhydroformers.com/what-is-hydroforming.aspx, last visited Sep. 27, 2011, three pages.

International Preliminary Report on Patentability issued May 17, 2011, for PCT Application No. PCT/US2009/006126, filed Nov. 13, 2009, one page.

International Search Report mailed Dec. 30, 2009, for PCT Application No. PCT/US2009/006126, filed Nov. 13, 2009, one page.

Loukus, A.R. et al. (Apr. 2007). "Optimization of Material Properties and Process Parameters for Tube Hydroforming of Aluminum Extrusions," *Journal of Engineering Materials and Technology* 129:233-241.

Marando, R. (2001). "Hydroforming—Part 2: Hydroforming May Allow Automotive Spaceframes to Make a Comeback," *AutoSpeed*, located at http://autospeed.com.au/cms/A_111291/printArticle.html, last visited Sep. 27, 2011, four pages.

Singh, H. (2003). "Introduction to Hydroforming," Figure 1-14 in Chapter 1 in *Fundamentals of Hydroforming*, Society of Manufacturing Engineers, Dearborn, MI, three pages.

Written Opinion mailed Dec. 30, 2009, for PCT Application No. PCT/US2009/006126, filed Nov. 13, 2009, four pages.

* cited by examiner

COMPRESSED GAS CONTAINER AS FRAME OF VEHICLE

CROSS-REFERENCE TO RELATED APPLICATIONS

This application is a continuation of U.S. patent application Ser. No. 12/804,240, filed Jul. 19, 2010, issued now as U.S. Pat. No. 8,079,437, which is a continuation-in-part of U.S. patent application Ser. No. 12/313,046, filed Nov. 17, 2008 now abandoned, the entire disclosures of which are incorporated herein by reference for all purposes.

FIELD AND BACKGROUND OF THE INVENTION

The invention relates to a hybrid hydraulic drive system for all types of terrestrial vehicles, including vehicles running on rails, using as prime mover, any rotational device able to give an output torque. A variable hydraulic pump may be connected to the prime mover and acts as a "power integrator", receiving hydraulic power from the accumulator, mechanical power from the prime mover, or a combination thereof, to supply the desired flow and necessary pressure to the hydraulic motors during operation. A second variable pump reloads the accumulator with the remnant power available, if any, during the whole cycle. The accumulator may be quite large and may also be used partially or totally, as the main load bearing full frame for all terrestrial vehicles. The braking energy may be returned to the accumulator. The whole vehicle is controlled by electronics, and in one embodiment uses only one joystick or pedal to control speed, direction, acceleration, braking and in some cases including steering.

The present invention thus relates to a series hybrid hydraulic drive system than can be applied with advantage to all terrestrial vehicles, with or without rails, including but not limited to industrial, commercial and military applications as well as to passenger vehicles. The prime mover, typically, but not necessarily, a conventional motor such as an internal combustion engine, or an electrical motor, are used to their maximum efficiency when running.

An accumulator, which is a device that operates as an energy storage device or storage reservoir for energy, is provided on the vehicle and is positioned as the load bearing frame of a vehicle, reloading when the vehicle is braking and/or when the prime mover is running and there is additional energy from the prime mover, and/or the accumulator is providing energy.

Hybrid hydraulic regenerative drive systems are known and have been applied to motor vehicles in the past. Parallel hydraulic systems are also available and have been successful in harnessing the braking energy of the vehicle and storing it in an accumulator, to be used to accelerate the vehicle and thereby provide acceptable energy savings.

The parallel hydraulic system may be used as an add-on on vehicles and does not necessarily address or solve the full energy consumption issues of those vehicles.

The conventional series hybrid hydraulic systems go beyond the parallel system, but lack a good and precise flow control speed. They have not solved, at low or acceptable cost, the recharge of the accumulator using the extra power of the prime mover when this is available.

Both the parallel and the series solutions and devices have a very significant handicap: steel accumulators can weigh more than fifty (50) times the weight of a lead-acid battery per unit of stored energy. When fiber made accumulators are used, the weight differential is still significant and can be about 12 to 1, but the price of making such as device increases greatly, making it in effect economically unfeasible. As a result, all or most, accumulators used for present hybrid hydraulic applications are generally quite small and may be usable only for short cycles, mainly for brake energy recuperation and release.

Both the parallel and series solutions, have major difficulties when the vehicle becomes larger in weight and/or dimension, almost all efforts have been devoted to automobiles, whereas the applicant solution is ideal for all applications, specially large vehicles either on wheels, tracks, tires or rail.

Furthermore, the scenario described above does not allow for those hydraulic systems to actually stop the engine, or the prime mover, when the accumulator is full and has energy available to propel the vehicle, as the vehicle will only run for a few seconds with the relatively small energy content of the accumulator. The presently available hydraulic systems, with few exceptions, are not configured or built to allow for this type of dual operating mode.

One aspect of this invention is therefore to address the limitations of the prior art systems by using a simpler and less expensive system, as well being able to not only significantly increase the efficiency of all terrestrial vehicles, but also to cut substantially their emissions.

In this specification, the term accumulator as the "frame" should be broadly interpreted to mean not only a single support frame for a vehicle but also could be a support frame having multiple tubular of equal or different dimensions and other components each tied together. Furthermore, in this specification the term "vehicle" also includes transportation, construction, industrial, mining and military moving devices, and other types of moving machinery.

SUMMARY OF THE INVENTION

According to one aspect of the invention, there is provided a hybrid hydraulic power system comprising: a prime mover; an accumulator forming the main frame of the vehicle; and a power integrator operatively connected to the prime mover and the accumulator and selectively able to draw power for the vehicle from the prime mover, the accumulator, or a combination thereof.

The hybrid power system may further comprise at least one hydraulic motor, the hydraulic motor being driven by stored energy in the accumulator when the power integrator receives power only from the accumulator.

The hybrid power system may preferably comprise a unidirectional coupling, between the prime mover and the power integrator, the unidirectional coupling allowing torque to travel in one direction only, from the prime mover to the power integrator, and freewheeling when the prime mover is at a standstill and the power integrator is running.

A variable charge pump may be mounted on a shaft driven by the prime mover; the charge pump operating to recharge the accumulator with additional available power from the prime mover and/or the accumulator when it is running.

Preferably, there is a driver interface for controlling speed, acceleration and braking, the interface being selected .from one or more of a pedal and a joystick. A controller is provided for receiving information from the system and utilizing such information to regulate the power integrator, charge pump and valves.

The prime mover may be <50% smaller than a corresponding prime mover would require in an equivalent vehicle with similar specifications without the applicant hydraulic system.

In a preferred embodiment, the vehicle frame is the entire accumulator. The accumulator may be comprised of one or more tubing or pipe of the same or different sizes tied together to form the frame of the vehicle.

According to another aspect of the invention, there is provided a hybrid power system for a vehicle, the hybrid power system comprising: a prime mover; an accumulator; a power integrator operatively connected to the prime mover and the accumulator and selectively able to draw power for the vehicle from the prime mover, the accumulator, or a combination thereof; and a unidirectional coupling, or clutch, inserted between the power integrator and the prime mover to allow torque to travel only in one direction, from the prime mover to the power integrator. The accumulator may comprise the whole or a part of the frame of the vehicle.

In yet a further aspect of the invention, there is provided a method of moving a vehicle using hybrid power sources, the method comprising: providing a prime mover on the vehicle; providing an accumulator such that the frame of the vehicle is comprised wholly or partly of the accumulator; and connecting a power integrator to the prime mover and the accumulator and selectively drawing power for the vehicle from the prime mover, the accumulator, or a combination thereof according to the needs of the vehicle and the amount of energy stored in the accumulator. Preferably, unused energy generated by the prime mover is converted to hydraulically stored energy in the accumulator.

In summary, the invention in one aspect provides a hybrid hydraulic system whose objective is to address the economic and technical obstacles confronting hydraulics and its use in terrestrial vehicles, adding benefits not believed available with the prior art. By hybrid hydraulic system is generally meant a vehicle with both a prime mover or engine and an associated hydraulic system for energy storage which is able to store both unused energy from the prime mover as well as recover or harness braking energy, and the selective use the prime mover and hydraulic system depending on the needs of the vehicle as well as the amount of stored energy currently in the accumulator.

In accordance with one aspect of the invention, there is provided the use of an accumulator which is in whole or in part the frame of the vehicle. Such a configuration potentially overcomes one of the major drawbacks for the implementation of such hydraulics, namely, the large weight and volume per unit of stored energy of the accumulator. At the same time, this aspect of the invention allows for much larger accumulators than were previously possible, since the accumulator weight and volume is no longer as significant a consideration. The utilization of the frame or at least a part thereof as the accumulator allows an increased dimension of the accumulator, and may also allow for periods of operation of the vehicle without the prime mover running, saving on both fuel and emissions, as engines and electric motors consume unloaded about 40% of the maximum consumption or current in the case of the electric motors. It also allows its benefits to be applied to larger vehicles.

With this much larger accumulator, with a small weight/volume penalty, is now possible to shutoff the engine when the accumulator is full, and in doing so, the vehicle can run several minutes without the engine running, saving a large amount of energy.

When the prime mover is running, it will always do so at the maximum torque with the proper rpm (revolutions per minute), it's most efficient point. If, however, the operation of the vehicle does not fully need this power, a secondary or charging pump, will be activated for the purpose of reloading the accumulator with the available energy which is being generated by the prime mover, but not being used by the vehicle. Furthermore, the hydraulic motors will do the same when braking, namely, harness energy from the braking operation to charge the accumulator. The prime mover then, when running, will do so only at its optimum efficiency almost all the time.

This use of the accumulator as the frame of the vehicle could be used by other hydraulic or mechanical drive systems that require an accumulator, benefiting then, of the enormous advantage of this arrangement.

When more torque is needed at the wheels, which occurs mainly at the time of high acceleration of the vehicle, the accumulator flow will open to the suction side(boosting) of the power integrator, making the stored energy available for use and thereby contributing such stored energy in order to assist the prime mover to accelerate the vehicle. It will of course be appreciated that one important consequence of this arrangement is the potential use of smaller prime movers for the same weight and acceleration vehicles. If the pressure or energy coming from the accumulator is too high, the secondary pump will then send the extra energy back to the accumulator. In some cases, the invention may provide several settings of operation for the speed of the prime mover, such as: urban traffic (low), freeway (middle) and mountain (faster).

The coordination of the operation of the system, and optimally selective use of the prime mover and accumulator and their relative contribution to the vehicle at any given time, is preferably accomplished with a computer control and programmed software. In one embodiment of the invention, one version of the controls allows for the use of one pedal or joystick to control speed, direction, acceleration and braking. With a joystick being used, the elements of steering can be added, resulting in a vehicle which may be much simpler to control and much safer to operate. Further, the use of a continuous automatic transmission in accordance with an aspect of the invention allows for even greater efficiency and potentially lower emissions.

DETAILED DESCRIPTION OF THE INVENTION

Figure 1:
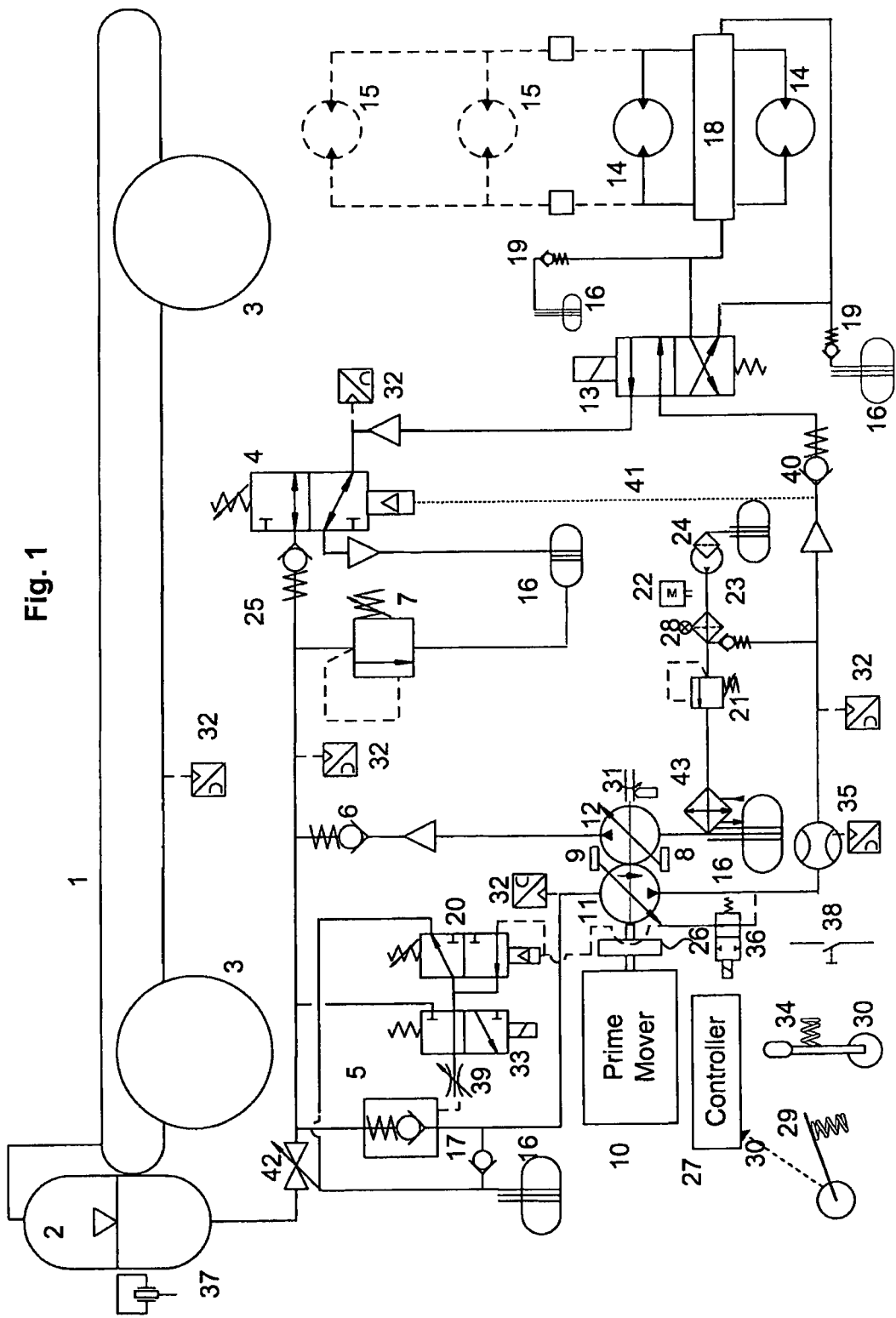
FIG. 1 is a schematic illustration of hybrid hydraulic system schematics in accordance with one aspect of the invention.

One preferred embodiment of the present invention is illustrated in FIG. 1 of the drawings. It should be appreciated that the embodiment shown in FIG. 1 of the drawings is representative of a hydraulic schematics, and variations and modifications may be made in accordance with the invention.

Figure 2:
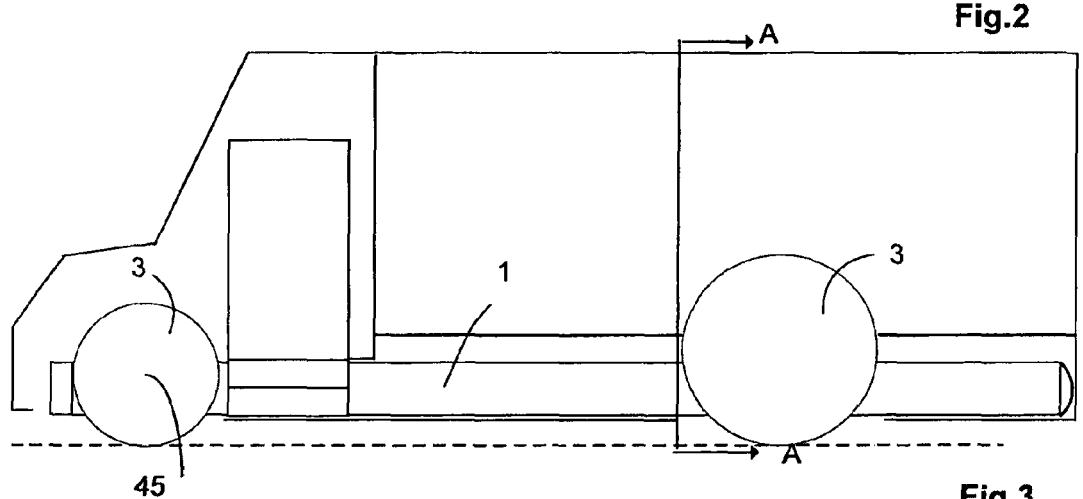
FIG. 2 is a schematic side view of a commercial van, using a hybrid hydraulic system in accordance with one aspect of the invention.
Figure 3:
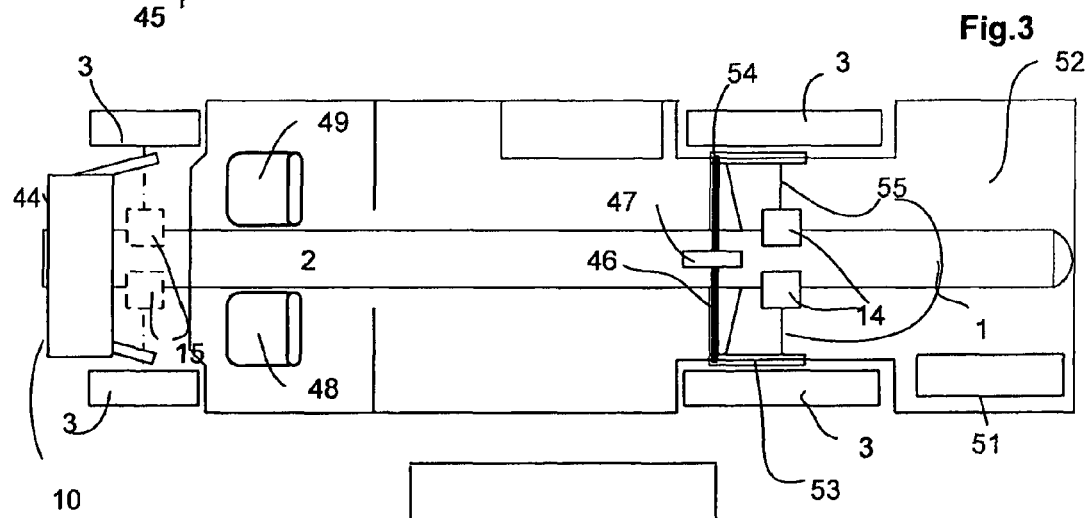
FIG. 3 is a top view of the van shown in FIG. 2 of the drawings.
Figure 4:
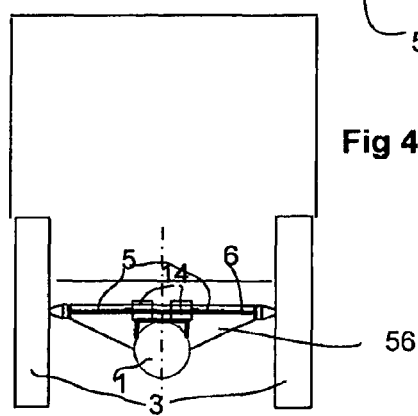
FIG. 4 is a view of a cutaway of the van along line A-A in FIG. 2 of the drawings.

FIGS. 2, 3 and 4 of the drawings comprise illustrations in schematic format of a vehicle sample application incorporating one preferred embodiment of the system on a commercial van. It should be understood that this is for illustration purposes only and the scope of the invention is not in any way limited by the use of this example. Furthermore, the system of the invention may be used on many types of vehicles as well as vehicles having different types of prime movers, including electric motors and internal combustion engines (ICE).

With reference to FIG. 1 of the drawings, there is shown a preferred embodiment of one hydraulic circuit which falls within the scope of the invention. FIG. 1 of the drawings shows schematically an accumulator 1, the gas container, which simultaneously comprises and operates as the load bearing frame of the vehicle on which it may be installed. An oil and gas accumulator 2 is also provided and this accumulator may be separate from the accumulator 1, but both gas sides connected, or could be installed inside the accumulator 1.

The accumulators 1 and 2 may in certain embodiments be combined into a single accumulator, or accumulator 2 may be the whole frame of the vehicle, with oil and gas inside.

A prime mover 10 is provided which is, for example, an electric motor or an internal combustion engine. The prime mover 10 is connected via a unidirectional coupling or a clutch 26 to a unidirectional variable power integrator 11 which integrates the prime mover 10 and the hydraulic system (to be described) for optimal energy usage. The prime mover 10 is also connected along the same shaft to a unidirectional variable charge pump 12. This unidirectional coupling 26 allows for the operation of the system when the prime mover 10 is not running, just using the energy stored in the accumulator.

The power integrator II is controlled by a servo valve 9, while the charge pump 12 is controlled by a servo valve 8. Both of the servo valves 8 and 9 receive the appropriate signals from a controller 27 which receives input from the system and controls energy deployment based on such input. The accumulator 2 has an electronic oil level indicator 37 that signals the amount of oil in the accumulator 2 to the controller 27. If the amount of oil in the accumulator 2 is large, the signal from the controller 27 to start the system will not launch the prime mover 10, but rather utilize stored energy in the accumulator 2. If, however, the signal from the accumulator 2 indicates a low amount of oil in the accumulator 2, the prime mover 10 will automatically be started at a set rpm, so that sufficient flow will be available to propel the vehicle.

Once the prime mover 10 is activated and starts running, the power integrator 11 and the pump 12 will have zero flow initially. The pump 12 will flow immediately after, charging the accumulator 2 and 1, with the available torque generated from the prime mover 10, via check valve 6, taking oil from the tank 16. Note that FIG. 1 shows several tanks with reference numeral 16. However, there is generally only one tank 16. Multiple representations of the tank 16 are shown for simpler understanding.

The power integrator 11, once it receives a signal to go to a certain flow, will take oil from the tank 16, via check valve 17, and send such oil to the hydraulic motors 14 (and 15 if so built) via flow meter 35, check valve 40, solenoid valve 13 (only one version shown) and controlling block 18. The block 18 may have several functions including that of relief valve, differential control effect, ABS, flow sharing, and the like. The flow of oil will be the same independent of the pressure. There are two anticavitation valves 19 that could be part of the block 18 that go to tank 16, in order to avoid vacuum to occur.

A pilot line 41 extends to a pilot operated three way, two position valve 4. When the pressure on line 41 reaches a certain value, the valve 4 will open the output of the hydraulic motors 14 and 15 to tank 16. On a braking generating mode, the valve 4 sends the output flow of the motors 14 (and motors 15) via check valve 25 and valve 42 to the accumulator 2. If the accumulator 2 reaches a certain pressure, oil is discharged back to the tank 16 via relief valve 7 or to the inlet of the pump 11. The valve 42 is just a service valve that isolates the accumulators 1 and 2 for safety purposes. The safety and/or auxiliary brakes are not represented here.

If the output pressure of power integrator 11 reaches a certain threshold, a pilot line goes through solenoid valve 36 (two way, two position) to the pilot valve 20, which is a three way, two position valve. The output of valve 20 goes through solenoid valve 33, a three way, two position valve, and controlled orifice 39 to open a pilot operated check valve 5. This action connects the high pressure accumulator to the suction of the power integrator 11, to allow for an elevated pressure at the output of the power integrator 11, obtaining higher accelerations of the vehicle with a much smaller engine (50% or less). The main output flow of power integrator 11 is controlled by said power integrator 11 and recharge pump 12. Any over speed of the prime mover 10, detected via speed sensor 31, causes the pump 12 to send the extra energy back to the accumulator 2 and 1, and in so doing, has the effect of maintaining a constant speed at the common shaft.

When the prime mover 10 is not running because enough energy is stored in the accumulator 2 (+1), the running mode for this situation will now be described. The solenoid valve 36 is energized, closing the pilot line to the pilot operated valve 20. The solenoid valve 33, a three way, two position valve, is energized opening the accumulator 2 via check valve 5 to the inlet of power integrator 11. The speed of the vehicle, given by the output flow of the power integrator 11, will be controlled by the swash plate position of the power integrator, and the set rpm of the system, via charge pump 12.

A pedal 29, or a joystick 34, command a position sensor 30 that transmits signals to the controller 27 with information as to what speed is desired, and what acceleration or braking rate is required. Internal controls in the controller 27 may be programmed in order to limit both the acceleration and braking or deceleration rate to a given maximum. A switch 38, which is an on-off switch, may be provided to allow for reverse operation when needed.

Both the pedal 29 or the joystick 34 go to zero output when released. If, at that point, prime mover 10 is running, it will continue running only until the accumulator 2(+1) is full, loading it via charge pump 12 and associated servo control valve 8. In that condition, the power integrator 11 is not creating any output flow for moving the vehicle acting as the operating brake and the vehicle is hence at a standstill. If the joystick 34 is supplied with an auxiliary sensor, then such a joystick may also be able to additionally control steering. This is not applicable, of course, to vehicles running on rails, but all the other functions would be available.

Several pressure transducers 32 are provided in the system in order to allow for the controller 27 to know the instantaneous pressure in several parts of the hydraulic circuit, and react properly thereto for both the operation as well as the safety of the vehicle.

Some auxiliary hydraulic functions may also be present in the system. Thus, a charge pump 23 may be provided and comprises a low flow, low pressure pump powered by a small electric motor 22. The charge pump 23 could also be powered by the main shaft of prime mover 10, mounted after or beyond the position of the charge pump 12. A strainer 24 associated with the tank 16 facilitates the flow to the inlet of the pump 23, while the output of pump 23 goes to a filter 28, relief valve 21, cooler 43, and back to tank 16.

FIG. 2 of the drawings schematically illustrates a side view of a van incorporating the hydraulic drive system of the invention. FIG. 2 shows a van including wheels 3. Front wheels 3 contain an ABS system 45, and an accumulator 1 as the frame of the van. In FIG. 3 of the drawings, the van is shown in top view, and includes a power unit 44, including in it a prime mover 10, power integrator 11, charge pump 12 and other hydraulic and electrical paraphernalia, floor 52, an accumulator 1 and 2 (which may be separate, combined into one unit or only 2 is the frame), CNG or Diesel tank 51, and hydraulic drive motors 14 and 15. Hydraulic drive motors 14 and 15 are associated with the wheels 3. Also shown in this figure are the driver seat 48, the passenger seat 49, compensation bar 46 and shock absorber 47. The van includes transmission shaft 55. FIG. 4 of the drawings shows a section of the van 10 through line A-A in FIG. 4 to further illustrate the integration of a hybrid power system into the vehicle, in this case a van, including main suspension 56.

The invention, in one aspect, thus provides for a hybrid hydraulic series system for a vehicle that will automatically send the required hydraulic flow at the required pressure to the hydraulic propulsion motors according to an electric signal, wherein any rotational device, capable of an output torque operates as the prime mover of the vehicle. The system includes an accumulator and is configured so as to recharge said accumulator with the extra power available, and not being utilized by the vehicle, from the engine or electrical motor when running.

The system, in one embodiment, allows for the running of the vehicle without the main power source being on, under full speed control and using the energy needed from that which has been stored in the accumulator.

In one form, the hybrid hydraulic system of the invention uses a unidirectional coupling or clutch connected between the prime mover and a main pump, thereby allowing torque transmission only in one direction only. The hybrid hydraulic system may carry an auxiliary pump for ancillary services, propelled by an electric motor with power supplied from the battery or the mains. The auxiliary pump may be directly connected to a shaft driven by the prime mover, along with a power integrator and the accumulator recharge pump.

In a preferred embodiment of the invention, the hybrid hydraulic system has a driver interface, which may be comprised of at least one foot pedal or a joystick to control, for example, vehicle speed, acceleration and braking. The steering of the vehicle could also be incorporated into the joystick control features when applicable and desired. As opposed to standard vehicles, our system sends instructions to the wheels to accelerate and run at the instructed speed, instead of just sending a high torque to the wheels.

In accordance with an aspect of the invention, the braking energy produced by the vehicle will be passed to the accumulator. If the accumulator is full, the prime mover of the vehicle is stopped and the vehicle will then continue its operation by utilizing the energy stored in the accumulator. The prime mover will be restarted automatically when the accumulator reaches a lower set value, which can be selectively programmed into the system.

The hybrid hydraulic system may have hydraulic motors which may be of the piston type, single or double flow capacity, and connected in series, parallel or a combination as considered most appropriate in the circumstances. The valves may have slippage and ABS controls, and the non-powered wheels of the vehicle may have also brakes with ABS.

In a preferred form of the invention, for higher speed vehicles the hydraulic motors are mounted on the frame of the vehicle and not directly on the wheels. They may be connected to the wheels with universal joints shaft. For lower speed applications, and ones where no suspension devices are provided, the hydraulic motors may be part of the wheel.

Preferably, the unidirectional variable flow pump may constitute a power integrator, since it can receive high pressure flow at its suction from the accumulator, and may also receive mechanical input from the prime mover. This power integrator selects upon command from the controller as a power source the prime mover, the accumulator, or a combination of the two in proportions which take into account the needs of the vehicle (acceleration, speed, braking etc.). The output flow from the power integrator goes to the driving hydraulic motors. The charging pump is constantly changing the reserve of energy available in the accumulator.

The hybrid hydraulic system may have a secondary unidirectional variable charge pump on the same shaft as that of the power integrator. This secondary unidirectional variable charge pump recharges the accumulator if the prime mover has extra torque and/or the accumulator have extra oil pressure.

The hybrid hydraulic system further comprises a controller which is programmed with software. This software may set a maximum acceleration rate and a minimum braking rate for the vehicle. The operator of the vehicle can thus choose a slower acceleration than the one set up in the controller, as well as a slower braking rate, by moving the pedal or joystick at a lower rate of position change, or in other words more slowly. The speed of movement of the pedal or joystick will thus determine the acceleration and braking rates.

In accordance with one aspect of the invention, the hybrid hydraulic system may have an ICE prime mover which may have several speed settings (rpm) for different applications. The settings are such that any new setting will create a new constant rpm, using a governor; the said settings will be close, up or down, from the maximum torque rpm of the ICE.

The prime mover in a vehicle having the hybrid hydraulic and prime mover power centers may be much smaller (less than 50%) than that required in a vehicle having a prime mover which is alone required to produce the same speed and acceleration in a similar vehicle without the hybrid hydraulic power.

When the system of the invention is applied to or used on rail cars, each car may optionally have its own motive power which may be controlled by wireless input. As a consequence, locomotives may be eliminated and trains can be easily coupled and uncoupled using the hydraulic power system of the invention.

In a preferred embodiment of the invention, the hybrid hydraulic system may have a large accumulator which is in whole or in part the frame of the different vehicles on which it is mounted or installed, such vehicles including automobiles, taxis, vans, buses, trucks, subway cars, tramway cars, railroad cars, tractors, excavators, caterpillars, tanks, airplanes, forklifts, military gear, and the like. The list provided above is not intended to limit the type of vehicle that may be used with the invention, but is only a representative sample illustrating the diversity of the applications for the system of the invention.

The hybrid hydraulic system used for the accumulator as the frame of the vehicle may be comprised of pipe or tubing. The tubing may be comprised of one or several large tubing components or pipes, or smaller pipes or tubing welded together forming the vehicle frame or smaller pipes or tubing welded together like in a steam boiler. An appropriate combination of sizes and shapes may be used in a specific application according to the needs of the situation.

In one embodiment of the invention, the hybrid hydraulic system comprises a linear transducer which sends a signal to the controller indicating the volume of oil in the accumulator.

PART NAME

FIG. 1
1 Frame/Accumulator
2 oil/air accumulator
3 Vehicle wheels
4 Pilot operated valve/three way/two pos.
5 Pilot operated check valve
6 Check valve
7 Pressure relief valve
8 Servo control Pump 12
9 Servo control Power Integrator 11
10 Prime mover
11 Power integrator
12 Recharge pump
13 Reverse valve 4 way/two position
14 Hydraulic motors
15 Hyd. motors for multiple wheels propulsion
16 Hydraulic Reservoir
17 Check valve
18 Multiple function block/slippage, ABS
19 Check valve
20 Pilot operated valve/three way/two pos.
21 Low pressure relief valve
22 Auxiliary electric motor
23 auxiliary charge pump
24 Strainer
25 Check valve
26 Electric clutch or unidirectional coupling
27 Controller
28 Filter
29 Foot pedal
30 Position sensor
31 Main shaft speed feedback
32 Pressure sensor
33 Solenoid valve three way/two position
34 Joy stick
35 Flow transducer
36 Solenoid valve two way/two position
37 Position transducer for accumulator
38 on-off switch for forward/reverse
39 variable flow control orifice
40 Check valve
41 Pilot line
42 on-off ball valve
43 Oil cooler
FIGS. 2,3 and 4
44 Power unit
45 ABS non powered wheels
46 Compensation bar
47 Shock absorber
48 Driver Seat
49 Passenger Seat
50
51 Diesel or CNG tanks
52 Floor
53 suspension lever
54 suspension shaft
55 Transmission shaft
56 Main suspension
57
58
59
60
61

The invention claimed is:

1. A method comprising:
providing an accumulator, wherein said accumulator is composed of one or more steel tubes that comprise a metal frame of the chassis of a vehicle having a vehicular longitudinal axis, wherein each of said one or more steel tubes has a longitudinal axis and does not deviate from the longitudinal axis of each of said one or more steel tubes, wherein said one or more steel tubes has ends and lateral sides, wherein said lateral sides comprise attachment surfaces for structural elements, wherein the longitudinal axis of one of the steel tubes is oriented along the vehicular longitudinal axis;
storing vehicular running energy in said accumulator as compressed gas; and
using said accumulator with one or more mechanical or hydraulic transmission systems for running the vehicle.

2. An accumulator comprising:
one or more steel tubes that comprise a metal frame of the chassis of a vehicle having a vehicular longitudinal axis, wherein each of said one or more steel tubes has a longitudinal axis and does not deviate from the longitudinal axis of each of said one or more steel tubes, wherein said one or more steel tubes has ends and lateral sides, wherein said lateral sides comprise attachment surfaces for structural elements, wherein the longitudinal axis of one of the steel tubes is oriented along the vehicular longitudinal axis;
wherein said accumulator stores vehicular running energy as compressed gas; and
wherein said accumulator is used with one or more mechanical or hydraulic transmission systems for running the vehicle.

* * * * *